April 20, 1926.
H. C. OSBORNE
VALVE
Filed July 12, 1924
1,581,595
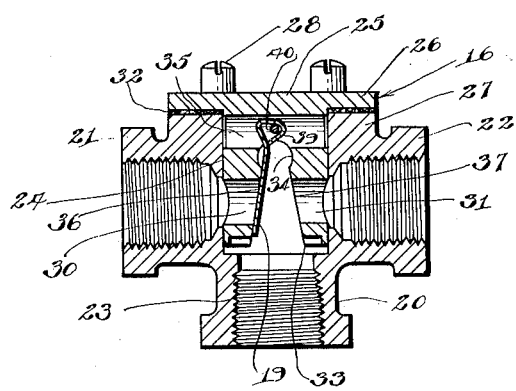
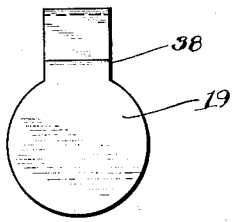
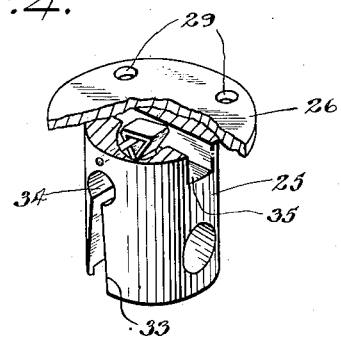
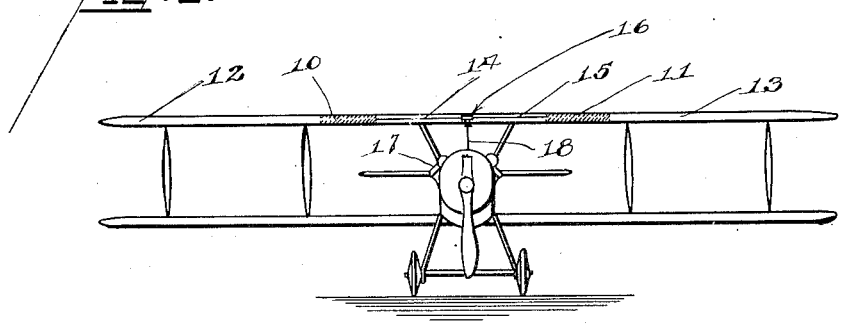
INVENTOR
Herbert C. Osborne
BY Robert H. Young
ATTORNEY Patented Apr. 20, 1926.

1,581,595

UNITED STATES PATENT OFFICE.

HERBERT C. OSBORNE, OF BALTIMORE, MARYLAND.

VALVE.

Application filed July 12, 1924. Serial No. 725,602.

*To all whom it may concern:*

Be it known that I, HERBERT C. OSBORNE, a citizen of the United States, residing at Baltimore, in the county of Baltimore and State of Maryland, have invented certain new and useful Improvements in Valves, of which the following is a specification.

This invention relates to a valve and more particularly a pendulum check valve for use in airplane fuel systems and the like.

The principal object of the invention is to provide a valve for regulating the discharge of fuel from two gravity fuel tanks in the wings of an airplane to maintain equilibrium or stability in level flight by keeping the same level in both tanks.

Another object of the invention is to provide a valve in a fuel system of the character mentioned which, being of the pendulum type, is arranged to be moved when the airplane banks so that fuel is taken from the tank at the higher level during the banking movement.

Other objects of the invention having reference to details of construction of the valve will be brought out with the foregoing objects in the following specification, in which reference is made to the accompanying drawing.

Fig. 1 is a central vertical cross section of a pendulum type check valve made in accordance with the invention.

Fig. 2 is a diagrammatic view showing the installation of the valve in the fuel system of an airplane.

Fig. 3 is an isolated front elevation detail of the pendulum valve member, and

Fig. 4 is an isolated perspective, partly in section, of the valve plug assembly.

The valve of the present invention, while capable of use in other similar connections, was primarily designed for use in connection with the fuel system of an airplane such as that shown diagrammatically in Fig. 2. In this figure a pair of fuel tanks, 10 and 11, are indicated carried by the wings 12 and 13 of the airplane. These tanks may be of the type forming a part of a pressure fuel system to be supplied with fuel from a main tank in the fuselage by a fuel pump, or they may be of the simple gravity type carrying the entire fuel supply and have no connection with a supply pump. The tanks 10 and 11 have service pipes 14 and 15 which extend into the opposite branches of the valve 16 of the present invention, the details of which will be described hereinafter. The fuel flows from the valve 16 to the float chamber of the carburetor (not shown) of the engine 17 through a pipe 18 common to the two pipes 14 and 15. As will be presently apparent, the valve 16 functions to maintain the same level and hence the same weight of fuel in the two tanks 10 and 11. This insures lateral stability or equilibrium in level flight. Furthermore, due to the pendulum action of the valve member 19, as it will be referred to hereinafter, fuel is taken from the outside tank on a bank, that is, the tank at the higher level when a ship is banking. In a sustained bank, as when spiraling, this practice is of advantage manifestly, since then it is desirable to keep the outer, or upward, tank lighter. After the sustained bank, when the plane is again in level flight, the valve automatically functions to resume the uniform level in the two tanks.

The valve 16 comprises a hollow T fitting 20 having the opposed inlet branches 21 and 22 which are connected respectively with the pipes 14 and 15 of the fuel system above described, and a common outlet 23 which is connected with the pipe 18, above mentioned. A socket 24 is provided in the fitting 20 at the junction of the three branches and receives a plug 25 generally cylindrical in form having an enlarged end to provide a flange 26 to over-lie a boss 27 on the fitting 20 and receive cap screws 28 for securing the plug 25 in the fitting. The holes 29 which receive the screws 28 are unsymmetrically located on the same radius in the flange 26. The internally threaded holes in the boss 27 that receive the screws 28 are similarly located to register with the holes 29 in only one position of the plug 25. This is to insure proper communication between ports 30 and 31 in the plug 25 with the branches 21 and 22 respectively. A gasket 32 is preferably provided beneath the flange 26 to secure a fluid-tight joint.

The plug 25 has a V notch 33 entering the bottom thereof and communicating with a cylindrical cross bore 34 at its upper end. The latter bore communicates with another bore 35 extending at right angles which is broached to have a square cross section to provide parallel side walls to guide the valve 19 in its pendulum movements. The opposite sides of the notch 33 provide valve seats 36 and 37 for the ports 30 and 31 respectively. The valve 19 is of a disc form having a rectangular lug 38 bent into an approximately triangular shaped loop 39 as shown in Fig. 1 to receive a pin 40 entered through the plug 25 and extending crosswise through the middle of the bore 35. The valve 19 is suspended from the pin 40 with one flat side of the loop 39 resting loosely on the pin. This provision insures proper seating of the valve 19 flatly and with a fluid tight fit on either of the seats 36 or 37 to seal either of the ports 30 or 31, respectively. This arrangement for mounting the valves provides a delicate pivot in the sense that it is responsive to a slight change in pressure.

The operation of the valve will be apparent from the foregoing description. Assuming that both tanks 10 and 11 contain a quantity of fuel, but that one of them, say the tank 10, has slightly more fuel in it than the tank 11. Under these conditions, if the ship is in level flight, the fuel coming from the tank 10 will be under a greater head than that coming from the tank 11, and as it passes through the port 30, will overcome pressure of the fuel acting on the opposite side of the valve 19 entering through the port 31 and will move the valve to the right to cover the seat 37 and seal the port 31. This will leave communication between the branches 20 and 21 and fuel will be taken from the tank 10 until it contains approximately the same amount of fuel as the tank 11, at which time the pressure acting on opposite sides of the valve 19 will be in equilibrium. Then, both of the branches 21 and 22 will be in communication with the branch 20. As often occurs, a greater restriction in one of the lines 14 or 15 will result in fuel flowing from one tank faster than from the other. The valve 16 under these conditions, serves to control the discharges from the two tanks so that a uniform level is maintained. When the ship banks, the pressure of the fuel coming from the tank on the outer side, that is, the higher tank, will be greater than the pressure of the fuel from the lower tank, despite the uniform distribution of the fuel, and as a consequence, the valve 19 will close off the port leading to the lower tank so that fuel will be taken only from the higher tank. On resuming level flight, a condition of equilibrium between the two tanks is automatically secured by the valve in the manner above described.

I claim:

1. A valve to control the flow of a fluid through a pipe on a vehicle, comprising a casing having an inlet and an outlet opening, and a valve member therein pivoted to swing normally by pendulum action to a central dependent position when the vehicle tilts, whereby to control one of said openings.

2. A valve to control the flow of a fluid through a pipe on a vehicle, comprising a casing having two inlet openings and an outlet opening, and a valve member therein delicately pivoted to swing normally by pendulum action to a central dependent position when the vehicle tilts, whereby to control one of said inlet openings.

3. A valve to control the flow of fluid in a fluid system comprising a casing having two inlet openings in a horizontal plane and an outlet opening, a flap valve member delicately mounted therein whereby a slight change in pressure in the inlet openings affects its movement, the said mounting being pivotal whereby the valve swings normally by pendulum action to a central dependent position when the inlet openings are displaced from the horizontal plane, said combined forces affecting the position of said member.

4. In an aircraft, a pair of spaced fuel tanks, a service pipe leading from each of said tanks, a valve casing having said pipes connected to inlet openings therein, and having a common discharge to a fuel reservoir at another level, and a pendulum valve member delicately pivoted between said inlets in said casing, adapted for movement upon the tilting of the aircraft, whereby to control the passage of fluid through one of said inlet openings.

5. In an airplane, gravity fuel tanks carried by the wings of the airplane for supplying fuel to a reservoir at a lower level, a T connection having laterally opposed inlet branches connected with said tanks, and having the intermediate common outlet branch connected with said reservoir, and a laterally swingable pendulum valve in said connection between said inlet braches, adapted for control of the inlet branches upon the tilting of the airplane, whereby to control the passage of fluid through one of said inlet openings.

6. A valve comprising a hollow T fitting having the opposed branches serving as inlets and the intermediate branch serving as an outlet, a plug entered in said fitting between the two opposing branches thereof having ports therein to communicate with said branches, and having a V notch therein providing opposed valve seats, one for each of said ports, a hole provided in said plug over said ports, having parallel side walls, a pin extending through said plug cross-wise through said hole, a flap valve having a lug extending into said hole guided between the side walls thereof and bent in the form of a triangular loop about said pin, with one side of the triangle riding loosely on said pin.

7. A valve comprising a hollow T fitting, a plug entered in said fitting between the two opposing branches thereof having ports therein to communicate with said branches, said plug having a V notch therein providing opposed valve seats, one for each of said ports, and a flap valve pivoted to swing in said notch between said seats, to cover either of said seats and thereby close off either of said opposed branches.

8. A valve comprising a hollow T fitting, a pair of opposed ports in said fitting communicating with the two opposing branches thereof, valve seats for each of said ports and a flap valve for covering either of said seats having a lug with a flat sided loop from which said valve depends, and a pin extending through said loop having said valve resting thereon with the flat side of the loop.

9. A valve comprising a hollow fitting, a valve plug entered in said fitting, having valve ports therein, and a valve to control said ports, a flange on said plug, said flange and said fitting having holes unsymmetrically located and adapted to register in only one position of the plug in said fitting, and means for securing said flange to said fitting.

10. In a valve, the combination of a casing, having a valve seat therein, a flap valve to cover said seat, a pin for supporting said valve, a flat sided loop on said valve to receive said pin resting on said pin on the flat side, the lateral edges of said loop being parallel, and a parallel walled guide to guide the movement of said loop, and hence, of said valve.

11. In a valve, a T fitting having opposed ports and valve seats therefor, a flap valve to control said ports and cover either of said seats, a pin for supporting said valve, said valve having a flat sided loop to receive said pin and rest on said pin on its flat side, the edges of said loop being parallel, and a parallel walled guide having the edges of said loop engaging the walls of said guide.

In testimony whereof I affix my signature.

HERBERT C. OSBORNE.